May 27, 1958     C. O. JAEGER     2,836,129
MONORAIL TOY WITH CURRENT CARRYING TRACK
Filed Nov. 10, 1955     2 Sheets-Sheet 1
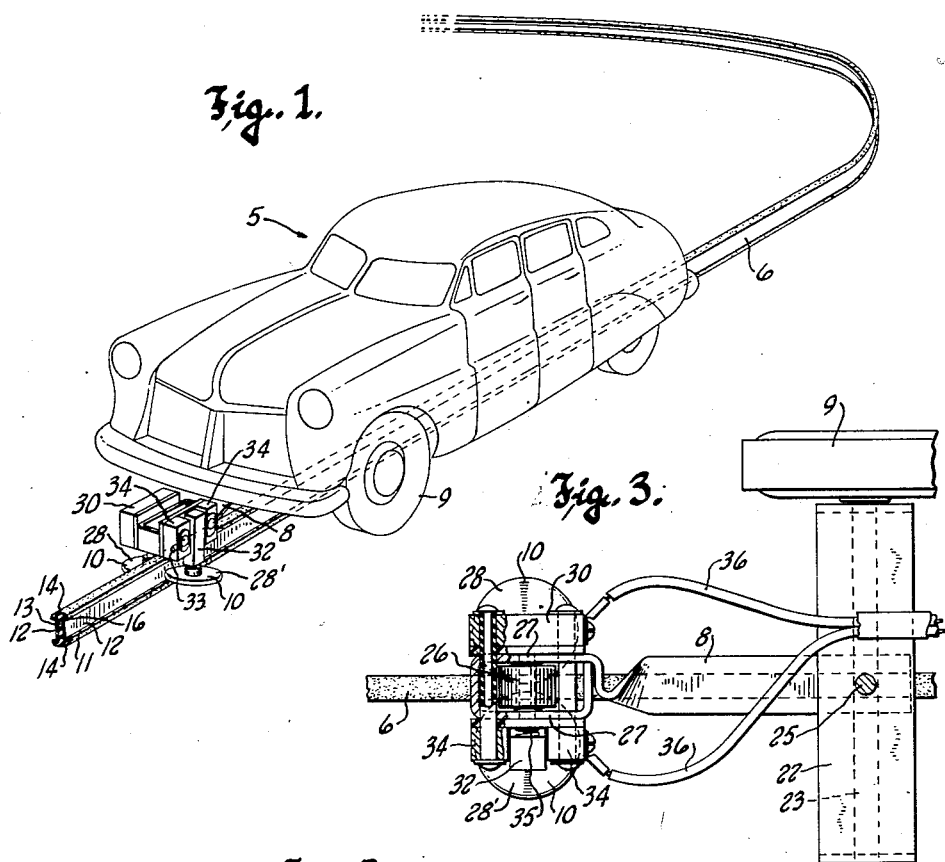
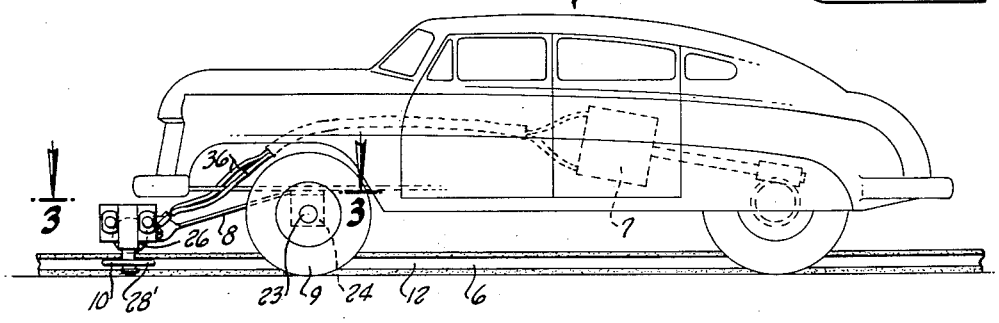
Inventor
Clemens O. Jaeger

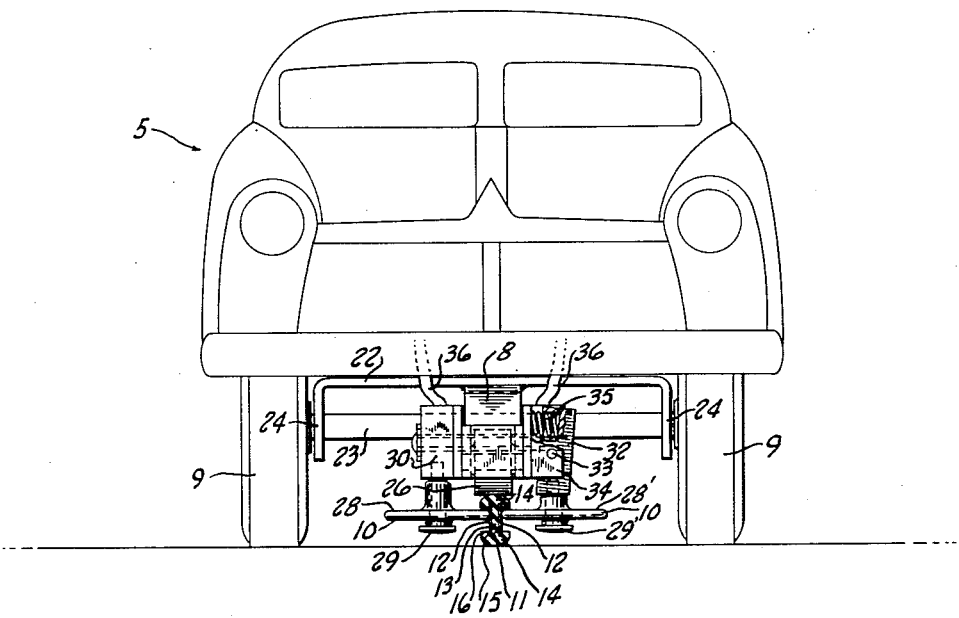
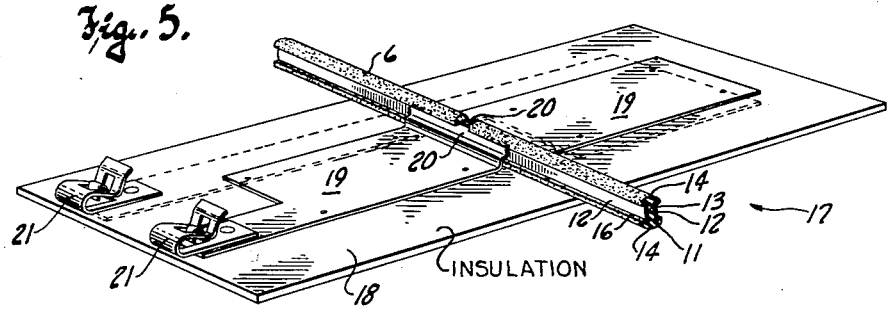
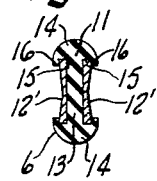 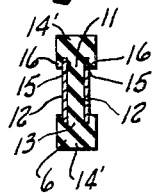 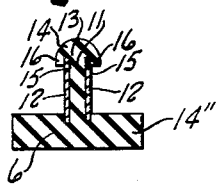

United States Patent Office 2,836,129
Patented May 27, 1958

2,836,129

MONORAIL TOY WITH CURRENT CARRYING TRACK

Clemens O. Jaeger, Milwaukee, Wis.

Application November 10, 1955, Serial No. 546,245

1 Claim. (Cl. 104—120)

This invention relates to vehicular toys, such as miniature automobiles and the like, and refers more particularly to an electric motor driven toy vehicle that is guided in its course of motion by a monorail track which also serves as a current conductor for transmitting electric current to the vehicle from a source thereof.

While the present invention is especially well suited for employment in connection with vehicular toys, and is described herein with particular reference to its application to such toys, it will be appreciated that the monorail track of this invention has a wide range of utility in more practical applications, being well adapted for use with mine and subway cars, trolley buses, and other vehicles requiring a two-conductor trolley system. This follows from the fact that it is an object of this invention to provide a monorail track having a pair of electrical conductors extending therealong, which conductors are so disposed at opposite sides of an insulative body member as to be engageable by a pair of opposed collectors on a vehicle traversing the track while at the same time said conductors are protected against accidental simultaneous engagement by conductive objects falling across the track, which might short circuit them.

Another object of this invention resides in the provision of a monorail track for providing guidance and electric current to a steerable self-propelled vehicle, which track is sufficiently flexible so that it may be curved on a relatively small radius to enable it to guide such a vehicle along a very sinuous path, and so that it may be rolled up to occupy a very small space for storage.

Still another object of this invention resides in the provision of a monorail track of the character described comprising an elongated flexible insulative body member and a pair of strip metal conductor bands secured to opposite sides of the insulative body member in such a manner as to be lengthwise shiftable relative thereto, so that the track can be flexingly curved without disruption of the mechanical connections between the conductors and the insulative member.

It is also an object of this invention to provide means for steeringly guiding a self propelled vehicle along a predetermined path and for conducting electric current from a source thereof to an electric motor carried by the vehicle and by which the vehicle is propelled, which means comprises a monorail incorporating a pair of conductors, and a pair of collectors on the vehicle, each cooperable with one of said conductors, said collectors being mounted on a guide arm on the vehicle in side by side relation to one another and being cooperable with one another to lightly clamp the monorail between them to insure good electrical and mechanical connection therewith.

A further object of this invention resides in the provision of an inexpensive monorail track of the character described which may be made in short sections that can readily be connected in end-to-end relation with one another, with good electrical and mechanical connections between the sections.

With the above and other objects in view which will appear as the description proceeds, this invention resides in the novel construction, combination and arrangement of parts substantially as hereinafter described and more particularly defined by the appended claim, it being understood that such changes in the precise embodiment of the herein disclosed invention may be made as come within the scope of the claim.

The accompanying drawings illustrate several complete examples of the physical embodiments of the invention constructed according to the best modes so far devised for the practical application of the principles thereof, and in which:

Figure 1 is a perspective view of a device embodying the principles of this invention and comprising a monorail track and a toy automobile cooperating therewith;

Figure 2 is a side elevational view of the monorail track and toy automobile shown in Figure 1;

Figure 3 is an enlarged fragmentary sectional view taken on the plane of the line 3—3 in Figure 2;

Figure 4 is a front elevational view of the device shown in Figure 1, portions being broken away and shown in section;

Figure 5 is a perspective view of a means for electrically connecting the monorail track of this invention with a source of current; and Figures 6, 7 and 8 are cross sectional views of several modified embodiments of the monorail track of this invention.

Referring now more particularly to the accompanying drawings, in which like numerals designate like parts throughout the several views, the numeral 5 designates generally a steerable wheeled toy, in this instance shown as comprising a miniature automobile, adapted to cooperate with a monorail track 6. The track conducts current from a source thereof (not shown) to an electric motor 7 inside the vehicle by which the vehicle is propelled, and the track also provides guidance for the vehicle, steering it along a predetermined course defined by the track.

The vehicle derives steering guidance from the track by means of a guide arm 8 connected with the front wheels 9 of the vehicle in such a manner as to actuate the same for steering movement, and a pair of collectors 10 mounted at the front end of the guide arm provide a connection between it and the track by which the vehicle is steered and by which current for the motor is also picked up. The guide arm and collectors, and the manner in which they cooperate with the monorail track, are described in detail hereinafter.

The track comprises a strip of insulative material 11 which is preferably flexible and which provides a body member, and a pair of thin metal bands 12, one on each side of the body member, which provide conductors connectable with a source of electric current. The body member comprises an upright web 13 having flanges 14 at its top and bottom projecting to both sides thereof. The metal bands flatwise overlie the web at opposite sides thereof and are retained in position by having their upper and lower marginal edge portions engaged in snugly fitting slots 15 in the opposing inner surfaces of the flanges, adjacent to the web. In other words, each conductor band may be said to be held in a channel at one side of the web provided by lip portions 16 projecting inwardly from the flanges to overlie the marginal edge portions of the conductive strip and which define the slots 15.

The metal conductors may comprise any sort of inexpensive material, such as steel box strapping, and the body member may be a rubber or resilient plastic extrusion. The conductive bands may be readily assembled to the body member by sliding them endwise into the channels in the body member, and because the metal bands and the body member are lengthwise slidable relative to one another the monorail track may be readily curved on a relatively short radius without its components being placed in lengthwise tension and compression relative to one another, as would be the case if the conductive bands were bonded to the insulative body member.

As illustrated by Figures 1, 4 and 6, the insulative body member may be substantially dumb-bell shaped in cross section and symmetrical about its vertical and horizontal center lines, or it may be substantially rectangular in cross section, as in the embodiment shown in Figure 7, with the faces of the flanges 14' substantially flat. If desired, the lower flange 14'' of the body member may have substantially width and be flat bottomed, as illustrated by the modification shown in Figure 8, to better insure that the track will lie evenly on a floor with its web upright. The conductive bands, too, may have various cross sectional configurations, for example being flat, as in the embodiments illustrated in Figures 4, 7, and 8, or having concave outer surfaces, as in the case of the bands 12' shown in the Figure 6 embodiment, which provide somewhat better guidance for the collectors engaged therewith.

Preferably the conductive metal bands are slightly longer than the insulative body member and project beyond the latter at one or both ends thereof. Sections of monorail track may then be readily joined in end-to-end relation by forcing the projecting end portions of the conductive bands of one section of track endwise into the corresponding channels of another track section, flatwise overlying the adjacent end portions of the conductive bands of the other track section, so as to assure a good mechanical connection between the track sections and at the same time provide good electrical contact between their corresponding conductor bands. Obviously the opposite ends of a single track section can be connected in the same manner to form a circular or other "endless" layout.

Alternatively, the conductor bands can be made the same length as the insulative body member, or slightly shorter, and a pair of short conductor bands can then be used to bridge each junction of the track sections, these short bands being forced into the adjacent end portions of the channels of the track sections being joined, overlying the conductor bands thereof.

A clip-like connector, designated generally by 17 (see Figure 5) facilitates connection of the conductive bands of the monorail with a source of current (not shown). The connector comprises a rigid, flat, insulative base member 18 of fiber board or the like having a pair of sheet metal contact fingers 19 flatwise secured to one face thereof in slightly spaced apart end-to-end relation. The adjacent ends of said fingers terminate in upturned resilient jaws 20, between which the monorail track is clampingly held. Good electrical contact between the conductive bands and the jaws 20 is assured by reason of the fact that each jaw has a substantially S-shaped cross-section which permits it to clear the flange portions 14 of the insulative body member of the track and the further fact that the two jaws are spaced apart a distance such that interposing the monorail track therebetween spreads the jaws slightly, against the resilience of the metal fingers, whereby the monorail is held between them under clamping bias.

The connector may thus also serve as a mechanical connection between endwise adjacent track sections. Suitable terminals 21 connected with the contact fingers provide for connection thereto of supply conductors (not shown).

The steering mechanism of the vehicle comprises an axle supporting member 22, which carries the front axle 23 and to which the rear of the guide arm 8 is fixed. The axle supporting member comprises a flat strip of metal having its end portions 24 turned downwardly, and the front axle extends through coaxial holes in said downwardly bent end portions, the front wheels 9 of the vehicle being freely rotatably mounted on the projecting end portions of the axle. The supporting member is medially pivotally secured, as at 25, to the underside of the vehicle, so that swinging of the guide arm from side to side effects steering movement of the front wheels.

At its front end the guide arm has a roller 26 mounted thereon for free rotation on a horizontal axis. The roller is supported on a pin connected between a pair of laterally opposite fingers 27 on the arm 8 which embrace the roller and are formed by bending the front end portion of the arm back upon itself in the manner shown in Figure 3. This roller is adapted to ride on top of the track to keep the collectors 10 in the proper position for engagement with the conductive bands and prevent them from digging into a rug or other surface on which the track may be laid.

In the embodiment shown, the collectors comprise small metal wheels 28, 28', freely rotatable on the lower ends of upright trunnions 29, 29', and the peripheries of which are adapted to ride on the conductive bands of the track. The trunnion 29 which journals the wheel 28 is fixed in a metal block 30 mounted on the exterior of the adjacent finger 27 at the front of the guide arm, the block being insulated therefrom; while the trunnion 29' of the other wheel 28' is carried by the other finger of the guide arm in such a manner as to permit limited lateral movement of the wheel 28' toward and from said wheel 28. To this end, the trunnion of wheel 28' is fixed in a lever 32 rockably mounted on a pintle 33 extending substantially parallel to the guide arm and having its end portions secured in lugs 34 on the exterior of the adjacent finger of the guide arm and electrically insulated therefrom. The trunnion 29' of the wheel 28' projects downwardly from the lower end of the lever, and a compression spring 35 interposed between the top portion of the lever and a fixed part of the guide arm biases the lower end of said trunnion, and the collector wheel 28' carried thereby, laterally toward the other wheel 28.

Conductor leads 36 for the electric motor are connected with the collector wheels 28, 28' through the trunnions and trunnion carrying structure just described. It will be understood that suitable sliding brushes may be used in place of the rotatable collectors shown and described.

From the foregoing description taken together with the accompanying drawings it will be apparent that this invention provides a monorail track having conductors by which electric current may be conducted from a source thereof to collector means on a steerable self-propelled vehicle, for energization of a drive motor in the vehicle, which track also affords steering guidance to the vehicle.

What is claimed as my invention is:

In a toy of the type comprising a wheeled electric motor driven vehicle having steerable wheels, means for steering the wheels and for conducting current from a source thereof to an electric motor in the vehicle, said means comprising: a laterally swingable guide arm on the vehicle extending forwardly from the steerable wheels and connected with the same to actuate them for steering motion; means on the front of said guide arm providing a pair of opposing conductive collectors, insulated from one another and having limited movement toward and from one another; conductor means connecting each of said collectors with the electric motor in the vehicle; an elongated band of insulative flexible material having an upright web and flanges at its top and bottom projecting laterally beyond the web, which flanges have slots adjacent to the web and opening toward one another; a pair of flexible metal strips, each flatwise overlying a face of the web and having its longitudinal edge portions snugly though freely endwise movably engaged in said slots in the flanges to be thereby confined against lateral motion while free for longitudinal motion relative to the insulative band to permit flexure thereof, said metal strips being connectable with a source of current and engageable between said collectors; and means biasing the collectors toward one another and into engagement with the metal strips so as to have good electrical contact therewith and to afford guidance to the guide arm whereby the steerable wheels are actuated to cause the vehicle to follow the sinuousities of the flexible band, the upper flanges on the band coacting with the collectors to hold the vehicle on the track provided by the flexible band.

References Cited in the file of this patent

UNITED STATES PATENTS

| | | |
|---|---|---|
| 610,008 | Walkins | Aug. 30, 1898 |
| 958,160 | Neville | May 17, 1910 |
| 1,064,141 | Gorham | June 10, 1913 |
| 1,595,283 | Becker | Aug. 10, 1926 |
| 1,983,776 | Rosenthal | Dec. 11, 1934 |
| 2,040,665 | McKeige | May 12, 1936 |
| 2,068,403 | Eckstrom | Jan. 19, 1937 |
| 2,346,978 | Lent | Apr. 18, 1944 |
| 2,540,433 | Evans | Feb. 6, 1951 |
| 2,575,055 | Jaeger | Nov. 13, 1951 |
| 2,590,040 | Rose | Mar. 18, 1952 |
| 2,619,553 | Kroeckel | Nov. 25, 1952 |
| 2,685,003 | Barnes et al. | July 27, 1954 |

FOREIGN PATENTS

| | | |
|---|---|---|
| 1,027,124 | France | Feb. 11, 1953 |